Figure 1:
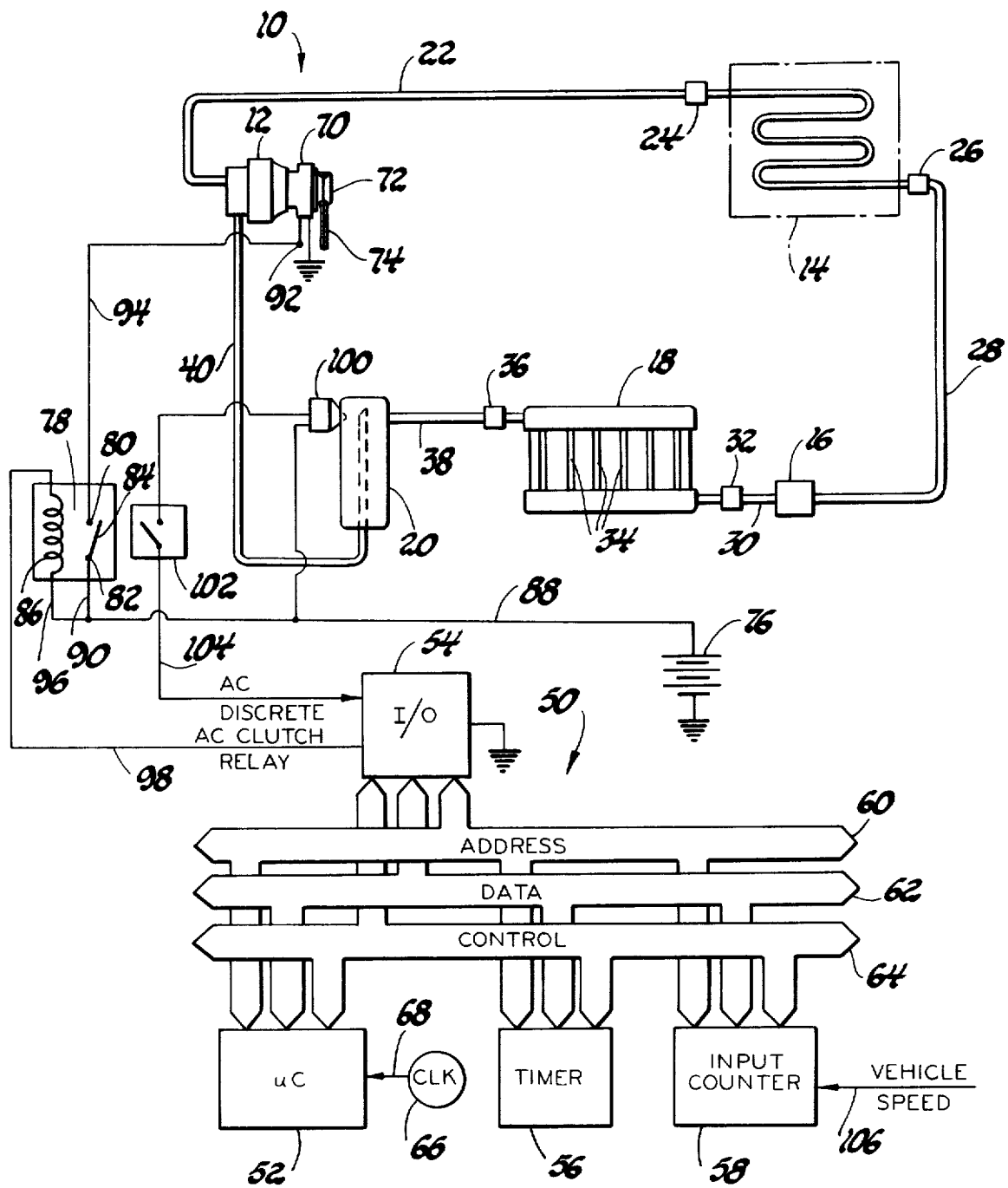

United States Patent [19]

Elmslie

[11] Patent Number: 4,481,784
[45] Date of Patent: Nov. 13, 1984

[54] AUTOMOTIVE AIR CONDITIONING COMPRESSOR CONTROL SYSTEM

[75] Inventor: James C. Elmslie, Pontiac, Mich.

[73] Assignee: General Motors Corporation, Detroit, Mich.

[21] Appl. No.: 548,295

[22] Filed: Nov. 3, 1983

[51] Int. Cl.³ .................. B60H 3/04; G05D 23/19; F25B 27/00
[52] U.S. Cl. .................. 62/133; 62/157; 62/243; 62/323.1
[58] Field of Search .......... 62/133, 157, 158, 231, 62/243, 244, 323.1, 323.4; 417/12

[56] References Cited

U.S. PATENT DOCUMENTS

| | | | |
|---|---|---|---|
| 3,121,314 | 2/1964 | Koyanagi | 62/133 |
| 3,664,148 | 5/1972 | Yonezu | 62/133 |
| 3,686,891 | 8/1972 | Wills | 62/158 |
| 3,710,587 | 1/1973 | Hayashi | 62/230 |
| 3,724,230 | 4/1973 | Muto et al. | 62/133 |
| 3,844,684 | 10/1974 | Kawamura | 417/13 |
| 4,135,368 | 1/1979 | Mohr et al. | 62/133 |
| 4,206,613 | 6/1980 | Shockley | 62/133 |
| 4,226,090 | 10/1980 | Horian | 62/133 |
| 4,274,265 | 6/1981 | Okumura | 62/158 |
| 4,334,255 | 6/1982 | Izumi | 62/133 |
| 4,395,203 | 7/1983 | Takada | 62/133 X |
| 4,424,682 | 1/1984 | Miska et al. | 62/133 |

Primary Examiner—Harry Tanner
Attorney, Agent, or Firm—Mark A. Navarre

[57] ABSTRACT

The refrigerant compressor of a motor vehicle air conditioning system in which the compressor is normally cycled on and off according to cooling demand is maintained continuously on or continuously off during idle operation according to a measure of the compressor duty cycle. During non-idle operation, a measure of the compressor duty cycle is compared to a reference duty cycle corresponding to a cooling demand above which it is desired to maintain the compressor on during idle operation and below which it is desired to maintain the compressor off during idle operation. At the onset of idle operation, the compressor is maintained on or off, and at the expiration of a time period corresponding to the duration of idle operation typically encountered in stop and go driving, normal compressor cycling is resumed.

3 Claims, 2 Drawing Figures

AUTOMOTIVE AIR CONDITIONING COMPRESSOR CONTROL SYSTEM

This invention relates to an automotive air conditioning system wherein an engine driven refrigerant compressor is cycled on and off to control compressor capacity.

In automotive air conditioning systems of the above type, the refrigerant compressor is generally connected to the vehicle engine through a selectively engageable electromagnetic clutch. When the clutch is engaged, the engine drives the compressor; when the clutch is disengaged, the engine is effectively disconnected from the compressor. Generally, the clutch is controlled to cycle the compressor on and off in accordance with a measure of the vehicle cooling demand such as the pressure of the refrigerant vapor at the output of the evaporator.

The compressor represents a significant engine load, and during idle operation, the compressor cycling is most noticeable to the occupants of the vehicle. Accordingly, it has been suggested that the compressor be disabled whenever the vehicle speed is below a given level thereby eliminating clutch cycling at vehicle idle. However, this approach completely sacrifices the cooling effect of the air conditioning system for an indefinite period without regard to the cooling demand.

It has also been proposed, as disclosed in U.S. Ser. No. 348,912, filed Feb. 16, 1982, and assigned to the assignee of the present invention, to maintain the refrigerant compressor continuously on or off for a timed period during vehicle idling depending on an ambient temperature measurement. If the ambient temperature is above a given level, the compressor is maintained on for a timed period during idle; if the ambient temperature is below the given level, the compressor is maintained off for a timed period during idle.

The air conditioning system of this invention is related to the above-referenced U.S. Ser. No. 348,912 but does not use ambient temperature sensing to determine the desired compressor operation during vehicle idle. Over and above Ser. No. 348,912, this invention recognizes that in an air conditioning system wherein the compressor is cycled on and off at a duty cycle which increases with increasing cooling demand, the decision as to whether the compressor should be maintained on or off during idle operation may be accurately and economically made by measuring the actual compressor duty cycle as an indication of the current cooling demand. According to this invention, the compressor duty cycle measured immediately prior to the onset of engine idle operation is compared with a reference duty cycle corresponding to a cooling demand above which it is desirable to maintain the compressor on during idle operation and below which it is desirable to maintain the compressor off during idle operation. If the measured duty cycle is less than the reference duty cycle, the compressor is maintained off during idle operation; if the measured duty cycle is greater than the reference duty cycle, the compressor is maintained on during idle operation. As with the system disclosed in Ser. No. 348,912, normal compressor cycling is resumed after a timed period corresponding to the duration of idle operation under normal stop and go driving conditions. If the air conditioning system is enabled during idle operation, no prior compressor duty cycle will have been measured and normal cycling of the compressor is permitted.

The air conditioning system of this invention thus provides the same advantages as the air conditioning system described in U.S. Ser. No. 348,912 without the use of a temperature transducer. The control system of this invention is particularly advantageous when the above described control functions are implemented with a microcomputer since no additional circuitry or sensors are required.

IN THE DRAWINGS

Figure 2:
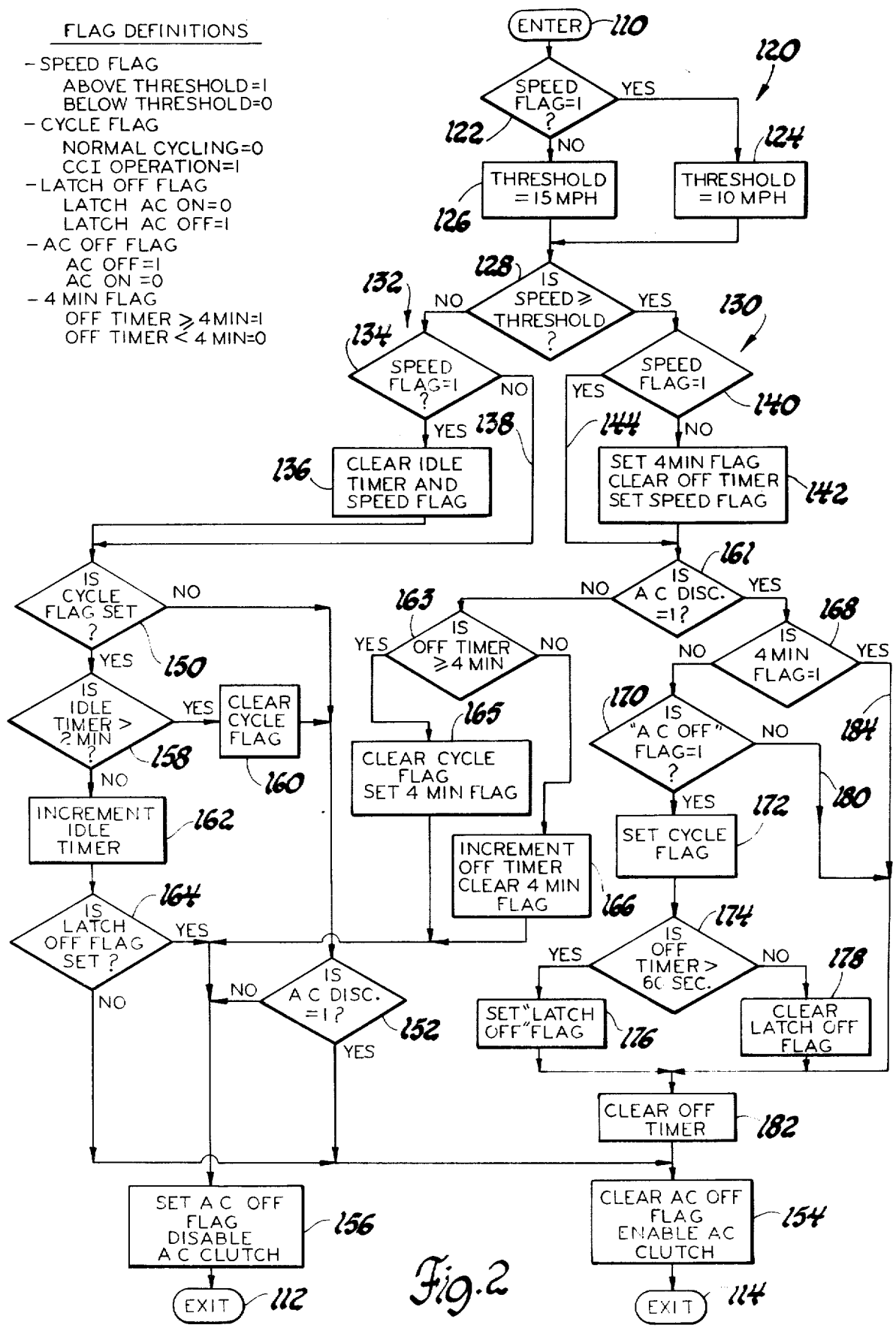

FIG. 1 is a schematic representation of an air conditioning system wherein the control functions of this invention are implemented with a microcomputer based system; and FIG. 2 is a flow diagram for performing the control functions of this invention with the microcomputer based system depicted in FIG. 1.

Referring now more particularly to FIG. 1, reference numeral 10 generally designates a conventional air conditioning system comprising a refrigerant compressor 12, a condenser 14, an orifice tube type expander 16, an evaporator 18 and an accumulator 20. The outlet of compressor 12 is connected via a flexible hose 22 to the inlet 24 of condenser 14. Condenser 14 is typically located in a manner to be exposed to a flow of ambient air for cooling and liquifying warm refrigerant discharged from compressor 12. The outlet 26 of condenser 14 is connected via line 28 to expander 16 which rapidly decreases the pressure of the liquid refrigerant discharged from condenser 14 to effect rapid cooling of the same. A more detailed description of expander 16 is given in the U.S. patent to Scherer et al. U.S. Pat. No. 3,815,379 issued June 11, 1974, and assigned to the assignee of the present invention. The outlet of expander 16 is connected via line 30 to the inlet 32 of evaporator 18. Liquid refrigerant in the evaporator 18 is vaporized or boiled in vertical passages or tubes 34, each having fluid conveying passages therein and exterior finned surfaces formed thereon. The evaporator 18 has an outlet 36 which is connected via line 38 to the inlet of accumulator 20. Accumulator 20 separates the liquid and gaseous refrigerant and discharges gaseous refrigerant via suction line 40 to the inlet of compressor 12. A more detailed description of accumulator 20 is given in the U.S. patent to Livesay U.S. Pat. No. 4,111,005, issued Sept. 5, 1978, and assigned to the assignee of the present invention.

Reference numeral 50 generally designates a microcomputer based system for carrying out the control functions of this invention. Essentially, the system 50 comprises a microcomputer (uC) 52 which communicates with several peripheral devices including an input/output (I/O) unit 54, a timer 56 and an input counter 58 via an address bus 60, a data bus 62 and a control bus 64. A high frequency clock 66 provides microcomputer 52 with a high frequency pulse train via line 68 for controlling the timing of the microcomputer operation. Although timer 56 and input counter 58 are shown separate from the microcomputer 52, it will be understood that such devices may be incorporated within microcomputer 52. The microcomputer 52 may be any of a number of known commercially available devices such as the MC6809 manufactured by Motorola Semiconductor Products, Inc., Austin, TX., which device includes internal read-only-memory, random-accessmemory, timing and analog-to-digital conversion capability.

Compressor clutch 12 is adapted to be driven by the vehicle engine (not shown) through a selectively engageable electromagnetic clutch 70 and a pulley assembly 72 which is connected to an engine output shaft pulley (not shown) via V-belt 74. Preferably, clutch 70 is of the type disclosed in detail in co-pending U.S. patent application Ser. No. 284,384, filed July 17, 1981, which application is assigned to the assignee of the present invention.

The energization circuit for electromagnetic clutch 70 includes the vehicle battery 76 and a clutch relay 78. The clutch relay 78 comprises a pair of contacts 80 and 82, a switch arm 84 adapted to pivot about contact 82 for forming an electrical bridge between contacts 80 and 82, and a coil 86 selectively energizable to attract switch arm 84. When coil 86 is de-energized, a spring or other resilient mechanism (not shown), holds switch arm 84 in the open position as shown in FIG. 1. When coil 86 is energized, the resulting magnetic field overcomes the spring force and moves switch arm 84 to the closed position electrically connecting contacts 80 and 82. The negative terminal of battery 86 is connected to ground potential, and the positive terminal of battery 86 is connected via lines 88 and 90 to contact 82. One terminal 92 of the electromagnetic clutch coil (not shown) is connected via line 94 to the relay contact 80 and the other terminal of the clutch coil is connected to ground potential. One end of relay coil 86 is connected via lines 88 and 96 to the positive terminal of battery 76 and the other end of relay coil 86 is connected via line 98 to input/output unit 54 of microprocessor system 50. Input/output unit 54 includes conventional driver circuitry operable in response to instructions from microcomputer 52 for selectively connecting line 98 to ground potential for controlling the energization of relay coil 86. To turn on compressor 12, line 98 is connected to ground potential through input/output unit 54 thereby completing an energization circuit for relay coil 86 through battery 76 and lines 88, 96 and 98. As a result, switch arm 84 of relay 78 is attracted to the closed position completing an energization circuit for the compressor clutch coil through battery 76 and lines 88, 90 and 94. To turn off compressor 12, input/output unit 54 disconnects line 98 from ground potential to de-energize relay coil 86. As a result, the relay switch arm 84 returns to its normal open position as shown in FIG. 1 to de-energize the compressor clutch coil.

In normal operation, the compressor 12 is cycled on and off in accordance with the cooling demand as sensed by pressure switch 100 which is responsive to the refrigerant vapor pressure in accumulator 20. The pressure switch 100 includes an electrical switch (not shown) actuable to an open or closed position as a function of the sensed refrigerant pressure relative to upper and lower reference pressures. When the refrigerant pressure rises above the upper reference pressure, the electrical switch is closed; when the refrigerant pressure falls below the lower reference pressure, the electrical switch opens. A complete description of a pressure switch meeting the above specifications is described in detail in U.S. patent to Hodits, Jr. et al. U.S. Pat. No. 4,209,997, issued July 1, 1980, which patent is assigned to the assignee of this invention.

The switch 102 represents a manual selector switch in the passenger compartment of the vehicle by which the operator of the vehicle can enable or disable the air conditioning system. When the air conditioning system is disabled, the switch 102 is in the open position as shown; when the air conditioning system is enabled, the switch is moved to the closed position.

A series circuit comprising battery 76, pressure switch 100 and selector switch 102 provides an input signal to input/output unit 54 via line 104. When the air conditioning selector switch 102 and the pressure switch 100 are closed, the voltage on line 104 rises substantially to that of battery 76, indicating that the refrigerant compressor 12 should be turned on to satisfy the current cooling demand. If selector switch 102 or pressure switch 100 are open, no voltage appears on line 104, indicating that the refrigerant compressor should be turned off.

A pulse train signal indicative of vehicle speed is applied via line 106 to input counter 58 of microprocessor based system 50. The vehicle speed indication on line 106 may be obtained in a conventional manner as with a variable reluctance transducer located in proximity to a toothed gear driven by the transmission output shaft. As will be understood by those skilled in the art, input counter 58 counts pulses on line 106 and scales the same to provide microcomputer 52 with an indication of the actual vehicle speed.

As indicated above, the air conditioning system of this invention determines whether the refrigerant compressor should be maintained on or off during idle operation based on the measured compressor duty cycle immediately prior to the onset of idle operation. This control function may be implemented by measuring the compressor on time, or alternately, the compressor off time and comparing the measured time interval to a reference time interval. According to the illustrated embodiment of this invention, microcomputer 52 determines the compressor duty cycle by measuring the duration of the compressor off time during each compressor cycle. The compressor off time measured immediately prior to the onset of idle operation is stored and compared to a reference off time above which it is desirable to maintain the compressor off during idle operation and below which it is desirable to maintain the compressor on during idle operation. A relatively large value of off time indicates a relatively low compressor duty cycle and hence a relatively low cooling demand. In such case, the refrigerant compressor may be maintained off for at least a timed period during idle operation without significantly deteriorating the air conditioning performance. A relatively low value of off time indicates a relatively high compressor duty cycle and hence a relatively high cooling demand. In such case, the compressor may be maintained on for at least a timed period during idle operation without producing excessive cooling in the vehicle. In either case, normal compressor cycling is resumed following the timed period, and the duration of the timed period corresponds to the duration of idle operation typically encountered in stop and go driving.

FIG. 2 depicts a flow diagram representing program instructions to be executed by microcomputer 52 for implementing the control functions of this invention. Conceivably, the program represented by the flow diagram in FIG. 2 may be part of a much larger program which controls other unrelated engine and vehicle functions. Hence, the block designated by reference numeral 110 is labelled ENTER, and the blocks designated by reference numerals 112 and 114 are labelled EXIT.

Each time the vehicle electrical system is powered up, microcomputer 52 executes a routine for initializing the various memory registers, timers and counters to a given state to ensure reliable operation at start-up. The flow diagram depicted in FIG. 2 refers to two timers: OFF TIMER and IDLE TIMER. As will later be explained, the OFF TIMER is used to measure the duration of the compressor off time for each cycle of compressor 12. The IDLE TIMER is used to generate the timed period which corresponds to the duration of idle operation typically encountered in stop and go driving—about 2 minutes. In addition, the flow diagram refers to five flags: a Speed Flag, a Cycle Flag, a Latch Off Flag, an AC Off Flag and a 4 Min Flag. As will be understood by those skilled in the art, a flag refers to a particular memory location in microcomputer 52 that is set or cleared by the program instructions for indicating the status of an operating parameter. The Speed Flag is used to indicate whether the vehicle speed is above or below a speed threshold near idle. When the vehicle speed rises above the threshold, the Speed Flag is set to a logic 1; when the vehicle speed falls below the threshold, the Speed Flag is cleared to a logic zero. The Cycle Flag is used to indicate whether normal compressor cycling is appropriate in idle operation; the flag is cleared if normal cycling is appropriate and set if constant on or constant off operation is appropriate. The Latch Off Flag is used during idle operation to indicate whether the compressor 12 should be maintained on or off. The Latch Off Flag is cleared if the compressor is to be maintained on and set if the compressor is to be maintained off. The AC Off Flag is used as a "bookmark" to indicate whether the compressor clutch was on or off the last time the flow diagram was executed by microcomputer 52. The flag is set if the compressor 12 is off and cleared if the compressor 12 is on. The 4 Min Flag is used to indicate whether a compressor off time duration has been reliably measured. If so, the flag is cleared; if not, the flag is set.

The flow diagram refers to two inputs: speed and AC discrete. The speed input provides an indication of the vehicle speed and is obtained from line 106 as shown in FIG. 1. The AC discrete input is used to indicate whether in normal operation the compressor should be on or off and is obtained from line 104 as shown in FIG. 1. As described earlier, the logical level of the AC discrete input is based on the state of the pressure switch 100 and the selector switch 102. If the above conditions indicate that the compressor 12 should be on, the AC discrete input is at a logic 1; if the compressor 12 should be off, the AC discrete input is at a logic zero.

A first portion of the flow diagram designated generally by the reference numeral 120 establishes a vehicle speed threshold separating idle and non-idle operation. As will be seen, the threshold speed is defined with hysteresis to prevent hunting. It is first determined, as indicated at instruction block 122, whether the Speed Flag is set to a logic 1. If so, the vehicle speed was above the threshold speed the last time the program was executed; if not, the vehicle speed was below the threshold the last time the program was executed. If instruction block 122 is answered in the affirmative, instruction block 124 is executed to set the threshold speed to 10 miles per hour. If instruction block 122 is answered in the negative, instruction block 126 is executed to set the threshold speed equal to 15 miles per hour. It is then determined, as indicated at instruction block 128, if the actual vehicle speed is greater than or equal to the threshold speed. If so, a first branch of the program designated generally by the reference numeral 130 is executed; if not, a second branch of the flow diagram designated by the reference numeral 132 is executed. In view of the above, it will be understood that the instruction blocks 122, 124 and 126 establish hysteresis for the speed threshold. During idle operation, the threshold speed is set at 15 miles per hour, while during non-idle operation, the threshold speed is set a 10 miles per hour. Thus, the flow diagram branch 132 is executed from vehicle startup until the point at which the vehicle speed increases above 15 miles per hour. Similarly, the flow diagram portion 130 is then executed until the vehicle speed falls below 10 miles per hour.

Referring firstly to the flow diagram portion 132, it is first determined, as indicated at instruction block 134, if the Speed Flag is set to a logic 1. If so, the IDLE TIMER and the Speed Flag are cleared as indicated at instruction block 136. If not, execution of instruction block 136 is skipped as indicated in flow diagram line 138. As a result, instruction block 136 is only executed when the vehicle changes from non-idle operation to idle operation. A similar function is performed by instruction block 140 and 142 in the flow diagram portion 130. Instruction block 140 determines if the Speed Flag is set to a logic 1, indicating non-idle operation. If not, the OFF TIMER is cleared and the Speed and 4 Min Flags are set as indicated at instruction block 142. If so, execution of instruction block 142 is skipped as indicated by flow diagram line 144. As a result, instruction block 142 is executed to clear the OFF TIMER and set the Speed and 4 Min Flags only when the vehicle changes from idle operation to non-idle operation.

Referring now once again to flow diagram portion 132, it is then determined if the Cycle Flag is set, as indicated at instruction block 150. If the Cycle Flag is not set, normal compressor cycling is indicated and instruction block 152 is executed to determine if the AC discrete is set to a logic 1. If so, instruction block 154 is executed to clear the AC Off Flag and to energize compressor clutch 70 for turning on compressor 12. If the AC discrete is at a logic 0 voltage potential, compressor operation is not indicated and instruction block 156 is executed to set the AC Off Flag and to de-energize the compressor clutch 70 for turning off compressor 12.

If at instruction block 150 it is determined that the Cycle Flag is set, indicating that continuous compressor operation at idle is appropriate, instruction block 158 is executed to determine if the IDLE TIMER indicates an interval in excess of 2 minutes. The 2-minute time interval timed by the IDLE TIMER represents the timed period beyond which continuous compressor operation during idle is not appropriate. Thus, if instruction block 158 is answered in the affirmative, instruction block 160 is executed to clear the Cycle Flag indicating that normal compressor cycling is appropriate. Then instruction block 152 is executed to check the level of the AC discrete signal and to either energize or de-energize the compressor clutch 70 as described above. If instruction block 158 is answered in the negative, the IDLE TIMER is incremented as indicated at instruction block 162. Instruction block 164 is then executed to determine if the Latch Off Flag is set. If so, the compressor 12 is to be maintained Off for a timed period during idle and instruction block 156 is executed to set the AC Off Flag and to de-energize compressor clutch 70 for turning off compressor 12. If the Latch Off Flag is not set, the compressor 12 is to be held on for a timed period during idle and instruction block 154 is executed to clear the AC Off Flag and to energize the compressor clutch 70 for turning on compressor 12.

Referring once again to the non-idle portion 130 of the flow diagram, instruction block 161 determines if the AC discrete on line 104 is at a logic 1 voltage potential. If not, compressor 12 should be turned off either or both because the pressure switch 100 or the selector switch 102 are open. In such case, instruction block 163 is executed to interrogate the OFF TIMER to determine if the measured off time is greater than four minutes—an off time interval that would never occur during normal compressor operation. If the measured compressor off time is greater than four minutes, the off time is unreliable as an indication of the vehicle cooling demand and instruction block 165 is executed to set the 4 Min Flag and to clear the Cycle Flag so that normal compressor cycling occurs in the next period of idle operation. If the measured off time is less than four minutes, instruction block 166 is executed to clear the 4 Min Flag and to increment the OFF TIMER. Instruction block 156 is then executed to set the AC Off Flag and to disable the compressor clutch 70 for turning off compressor 12.

If at instruction block 161 it is determined that the AC discrete signal on line 104 is at a logic 1 voltage potential, the vehicle cooling demand dictates that the compressor 12 be turned on. In such case, instruction block 168 is executed to determine if the 4 Min Flag is set. If not, the compressor off time has been reliably measured, and instruction block 170 is executed to determine if the AC Off Flag is set to a logic 1 voltage potential. If so, the compressor 12 is currently off, signaling the end of a compressor off period. In such case, instruction block 172 is executed to set the Cycle Flag and instruction block 174 is executed to determine if the measured off time is greater than 60 seconds. If the off time is greater than 60 seconds, the vehicle cooling demand is relatively low and instruction block 176 is executed to set the Latch Off Flag so that the compressor will be maintained continuously off during the next period of idle operation. If the off time is less than or equal to 60 seconds, the vehicle cooling demand is relatively high and instruction block 178 is executed to clear the Latch Off Flag so that the compressor will be maintained continuously on during the next period of idle operation. If at instruction block 170 it is determined that the AC Off Flag is cleared to a logic zero, the compressor 12 is already on and the instruction blocks 172-178 are skipped as indicated by flow diagram line 180. In either case, instruction block 182 is then executed to clear the OFF TIMER so that the OFF TIMER will be ready to measure the next compressor off time, and instruction block 154 is executed to clear the AC Off Flag and to enable the AC clutch 70 for turning on compressor 12.

If instruction block 168 is answered in the affirmative, the compressor off time has not been reliably measured and the execution of instruction blocks 170-178 is skipped as indicated by flow diagram line 184.

The operation of the air conditioning control system of this invention will now be described. In practice, satisfactory compressor operation has been achieved by executing the flow diagram as shown in FIG. 2 once every 100 milliseconds. As indicated earlier, the flow diagram is executed whether or not the air conditioning selector switch 102 is closed since the AC discrete signal is determined by the combination of the pressure switch 100 and the selector switch 102. As also indicated above, various flags and registers of microcomputer 52 are preset when power is first applied to the vehicle electrical system at start-up. Thus, the Speed Flag is cleared to indicate idle operation and the Cycle Flag is cleared to indicate normal compressor cycling. In addition, the IDLE TIMER and OFF TIMER are reset to zero. Soon after the engine has started, the flow diagram is executed for the first time. Since the Speed Flag has been cleared, instruction block 122 is answered in the negative, and the threshold speed is set at 15 miles per hour as indicated at instruction block 126. Under normal conditions, the vehicle speed will be less than 15 miles per hour at engine start-up and instruction block 128 is answered in the negative. As a result, the idle portion 132 of the flow diagram is executed. The first time the portion 132 is executed, instruction blocks 134 and 150 are answered in the negative and the compressor clutch 70 is either enabled or disabled in accordance with the logic level of the AC discrete input which is determined at instruction block 152. If the selector switch 102 or the pressure switch 100 or both are open, the AC discrete is at a logic zero potential and instruction block 156 is executed to set the AC Off Flag and to disable the AC clutch 70 by de-energizing relay coil 86. If the selector switch 102 and the pressure switch 100 are both closed, the AC discrete is at a logic 1 potential and instruction block 154 is executed to clear the AC Off Flag and to enable the AC clutch 70 by energizing relay coil 86. The program sequence described above is repeatedly executed as long as the vehicle speed is less than 15 miles per hour. If the selector switch 102 is open, the compressor 12 remains off; if the selector switch 102 is closed, the compressor 12 is cycled on and off at a duty cycle related to the vehicle cooling demand as sensed by pressure switch 100.

When the vehicle speed exceeds the threshold of 15 miles per hour, execution of the idle portion 132 of the flow diagram is suspended, and control unit 50 begins to execute the non-idle portion 130 of the flow diagram. To initialize non-idle operation, instruction block 142 is executed to clear the OFF TIMER and to set the speed and 4 Min Flag.

If the AC discrete is at a logic zero voltage potential—either because the selector switch 102 or the pressure switch 100, or both, are open—instruction block 163 is executed to determine if the OFF TIMER has counted a duration of more than 4 minutes. If so, it is assumed that the AC discrete is at a logic zero voltage potential due to an open circuit at selector switch 102; if not, it is assumed that the measured compressor off time is a reliable indication of the vehicle cooling demand. If the OFF TIMER is less than 4 minutes (as would be the case the first time after start-up that flow diagram portion 130 is executed), instruction block 166 is executed to increment the OFF TIMER and clear the 4 Min Flag. Then instruction block 156 is executed to turn off compressor 12. This operation is repeated so long as the AC discrete remains at a logic zero potential. When the OFF TIMER is incremented to a value corresponding to a duration of 4 minutes—off time that would not occur if the air conditioning system were energized—, instruction block 165 is executed to clear the Cycle Flag for indicating that continuous compressor operation at idle is not appropriate and to set the 4 Min Flag for indicating that the compressor off time has not been reliably measured.

If the AC discrete is at a logic 1 voltage potential, instruction blocks 154 and 168–182 are executed to turn on compressor 12 and to set the Cycle Flag if appropriate. If the 4 Min Flag is set (as determined at instruction block 168), the compressor off time has not been reliably measured and continuous compressor operation at idle is not appropriate. In such case the OFF TIMER is cleared and the compressor 12 is turned on. If the 4 Min Flag is not set, and the compressor 12 has not yet been turned on (as determined at instruction block 170), instruction blocks 172–178 are executed to set the Cycle Flag for indicating that continuous compressor operation at idle is appropriate and to set or reset the Latch Off Flag depending on whether the measured compressor off time is greater than or less than the reference off time of 60 seconds. This operation—the execution of flow diagram portion 130—is repeated so long as the vehicle speed exceeds the threshold of 10 miles per hour. Each time the compressor is cycled on, the measured off time is compared to the reference off time of 60 seconds, and the status of the Latch Off Flag is updated to reflect the cooling demand as indicated by the off time duration.

When the vehicle speed falls below 10 miles per hour, execution of flow diagram portion 130 is suspended and execution of flow diagram portion 132 is resumed. To initiate idle operation, instruction block 136 is executed to clear the IDLE TIMER and the Speed Flag. Clearing the IDLE TIMER serves to initialize the 2 minute timed period for which continuous compressor operation is permitted; clearing the Speed Flag causes the speed threshold to be reset at 15 miles per hour. If the Cycle Flag is not set, the compressor 12 is simply cycled on and off according to the logic level of the AC discrete as described above. If the Cycle Flag is set, on the other hand, instruction blocks 158–164 are executed to initiate continuous compressor operation for a timed period (2 minutes) in accordance with the status of the Latch Off Flag. If the Latch Off Flag is set, indicating low cooling demand, the compressor 12 is continuously disabled for the timed period. If the Latch Off Flag is cleared, indicating high cooling demand, the compressor 12 is continuously enabled for the timed period. Each time instruction block 162 is executed, the IDLE TIMER is incremented. When the count accumulated by the IDLE TIMER exceeds a value corresponding to a duration of about 2 minutes, instruction block 160 is executed to clear the Cycle Flag, whereupon normal compressor cycling is resumed.

As noted above, the control functions of this invention might alternately be implemented by measuring the compressor on time as an indication of the cooling demand, in such case, relatively low cooling demand would be indicated by a measured interval of less than a reference time period, and relatively high cooling demand would be indicated by a measured interval in excess of the reference time period. Of course, other measurements or indications of the compressor duty cycle might also be used.

It will be recognized that certain of the reference time intervals and constants set forth herein are somewhat arbitrarily determined. For example, the 2 minute timed period for which continuous compressor operation at idle is permitted is determined in relation to the duration of idle operation typically encountered in stop and go driving. On the other hand, the 60 second time interval used to distinguish between on times which indicate relatively high cooling demand and on times which indicate relatively low cooling demand is system dependent.

It will also be recognized that various other modifications to the illustrated embodiment may occur to those skilled in the art and that systems incorporating such modifications may fall within the scope of this invetnion which is defined by the appended claims.

The embodiments of the invention in which an exclusive property or privilege is claimed are defined as follows:

1. In an automotive air conditioning system including an engine-driven refrigerant compressor which is normally cycled on and off at a duty cycle which increases with increasing cooling demand, a method of operation which avoids cycling of the compressor during normal idle operation of the vehicle engine when such cycling is most noticeable to the vehicle occupants, the method comprising:
   sensing the onset of idle operation of the engine;
   measuring the compressor duty cycle immediately prior to the onset of the engine idle operation;
   comparing the measured duty cycle with a reference duty cycle corresponding to a cooling demand above which it is desirable to maintain the compressor in the on condition during normal idle operation and below which it is desirable to maintain the compressor in the off condition during normal idle operation;
   maintaining the compressor in the off condition when the measured duty cycle is less than the reference duty cycle and in the on condition when the measured duty cycle is greater than the reference duty cycle; and
   re-establishing normal cycling of the compressor when the elapsed time from the onset of the idle operation is such as to indicate that the idle operation of the engine is due to circumstances other than normal stop and go driving conditions.

2. In an automotive air conditioning system including an engine-driven refrigerant compressor which is cycled on and off as a function of cooling demand to define a compressor off time that decreases with increasing cooling demand, a method of operation which avoids cycling of the compressor during normal idle operation of the vehicle engine when such cycling is most noticeable to the vehicle occupants, the method comprising:
   measuring the compressor off time while the vehicle speed is in excess of a threshold value substantially corresponding to idle operation of the vehicle engine;
   comparing the measured off time with a reference off time corresponding to a cooling demand above which it is desirable to maintain the compressor in the on condition during normal idle operation and below which it is desirable to maintain the compressor in the off condition during normal idle operation; and
   when the vehicle speed drops below the threshold speed, overriding the normal cycling of said compressor for a predetermined time corresponding to the duration of idle operation typically encountered in normal stop and go driving such that the compressor is maintained off if the most recently measured off time is greater than the reference off time and the compressor is maintained on if the most recently measured off time is less than the reference off time, thereby to control the compressor during idle operation in a manner to avoid normal compressor cycling while providing a level of air conditioning performance which is based on the cooling demand in effect at the onset of idle operation.

3. A method of operating an automotive air conditioning system as set forth in claim 2, including the step of: inhibiting the overriding of the normal compressor cycling if the most recently measured off time is at least as great as a reference duration corresponding to a compressor off time which would not occur during normal compressor cycling, thereby to prevent the compressor from being maintained off or on during subsequent idle operation if the most recently measured off time is not a reliable indication of the cooling demand.

* * * * *